US006657428B2

(12) United States Patent
Kim (10) Patent No.: US 6,657,428 B2
(45) Date of Patent: Dec. 2, 2003

(54) APPARATUS AND METHOD FOR RESTORING STABILITY TO HEAD OF DISC DRIVE

(75) Inventor: Jong-yoon Kim, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/072,890

(22) Filed: Feb. 12, 2002

(65) Prior Publication Data

US 2002/0113587 A1 Aug. 22, 2002

(30) Foreign Application Priority Data

Feb. 19, 2001 (KR) .......................................... 2001-8137

(51) Int. Cl.[7] ........................ G01R 33/12; G11B 27/36
(52) U.S. Cl. ............................ 324/210; 360/75; 360/31
(58) Field of Search ................................ 324/210, 225, 324/252, 211, 212; 360/66, 75, 31

(56) References Cited

U.S. PATENT DOCUMENTS

| | | | |
|---|---|---|---|
| 5,650,887 A | | 7/1997 | Dovek et al. ................. 360/75 |
| 5,748,399 A | * | 5/1998 | Gill .............................. 360/66 |
| 5,969,523 A | | 10/1999 | Chung et al. ................ 324/252 |
| 6,157,507 A | * | 12/2000 | Korenari et al. ............. 360/53 |
| 6,275,028 B1 | * | 8/2001 | Matsui et al. ................ 324/210 |
| 6,295,175 B1 | | 9/2001 | Tomita et al. ................ 360/31 |
| 6,324,029 B1 | * | 11/2001 | Matsubara et al. ........... 360/75 |
| 6,366,420 B1 | * | 4/2002 | Ranmuthu et al. ............ 360/66 |
| 6,490,115 B1 | * | 12/2002 | Suzuki et al. ................ 360/75 |
| 6,519,108 B2 | * | 2/2003 | Au et al. ................. 360/77.04 |
| 6,522,134 B1 | * | 2/2003 | Gill ............................. 324/210 |

OTHER PUBLICATIONS

United Kingdom Patent Office's combined search and examination report No. GB 0125013.3 dated May 9, 2002.

* cited by examiner

*Primary Examiner*—N. Le
*Assistant Examiner*—Darrell Kinder
(74) *Attorney, Agent, or Firm*—Robert E. Bushnell, Esq.

(57) ABSTRACT

There is provided an apparatus and method for controlling a disc drive and, more particularly, an apparatus and method for restoring stability to a head of a hard disc drive, so that instability in a magneto resistive (MR) sensor of the disc drive can be restored through an electric shock. Instability of the MR head, i.e. incorrect alignment of the domain of the MR head, is determined by a bit error rate (BER) test and channel statistical measurement (CSM) test, and instability of the MR head is determined, the MR head is restored by applying electric shocks thereto. Therefore, the apparatus and method have advantages in that manufacturing process inferiority rate due to instability of head in a hard disc drive can be reduced, yield can be improved and the defect rate can be improved.

20 Claims, 5 Drawing Sheets

APPARATUS AND METHOD FOR RESTORING STABILITY TO HEAD OF DISC DRIVE

CLAIM OF PRIORITY

This application makes reference to, incorporates the same herein, and claims all benefits accruing under 35 U.S.C §119 from an application entitled Recovery Apparatus And Method Of Instability Head In A Disk Drive earlier filed in the Korean Industrial Property Office on Feb. 19, 2001, and there duly assigned Ser. No. 2001-8137 by that Office.

BACKGROUND OF THE INVENTION

1. Field of the Invention

The present invention relates to an apparatus and method for controlling a disc drive and, more particularly, to an apparatus and method for restoring stability to a head of a hard disc drive, so that instability in a magneto resistive (MR) sensor of the disc drive can be restored through an electric shock.

2. Description of the Related Art

Existing inductive heads have adopted a method of converting variations in magnetic flux of a disc into variations in a voltage of a head coil by winding a coil around ahead core. In this case, an inductance value of the head coil must be lowered for stability of the data signal in an inductive head if the frequency of a data signal is increased, which results in a drop in an inductive voltage of the head and causes unstable detection of the data signal.

A magneto-resistive head (hereinafter, "MR head") has been designed to solve the above problem of existing inductive heads. The MR head is adapted to a data signal having a high frequency by adopting an MR sensor that can easily perceive any variation in the magnetic flux of a disc. In the past, variations in the magnetic flux of a disc were converted into variations in an inductive voltage by means of a head coil in an inductive head, whereas in the MR head, variations in the magnetic flux of a disc are detected with variations in a resistance value through the MR sensor when reading data and recording density per unit area and a S/N ratio per unit area can be enhanced using the existing inductive head structure when writing data.

However, the MR sensor of the MR head has a problem of instability, which is not found in existing inductive heads. The instability of the MR head occurs in an unstable domain of the MR sensor and is mainly due to damage caused by soft electrostatic discharge (ESD), an improper hard bias (or permanent magnet) operation applied to the ends of the MR sensor and so on. If the capacity of the MR head is increased for the purpose of increasing sensitivity per unit area of the MR sensor, the width of the MR head becomes narrow as the number of tracks per inch (TPI) is increased, thus deteriorating the stability of the head. Such instability of the MR head brings about problems in a signal generated by a hard disc drive such as base line popping, base line noise, amplitude spikes and high amplitude asymmetry. Moreover, the instability of the MR head can occur at any point of time, even under normal conditions, such that a manufacturing process inferiority rate is raised and the performance of the hard disc drive is affected greatly.

To solve these problems, many proposals have been suggested, e.g., U.S. Pat. No. 5,650,887 to Moris Musa Dovek et al. and entitled System For Resetting Sensor Magnetization In A Spin Valve Magnetoresistive Sensor and Korean Laid-Open Patent No. 1999-072284. U.S. Pat. No. 5,650,887 discloses a technique in which a servo automatic gain control (AGC) is measured and a reset current is applied to a head only in the event that the measured servo AGC is 20%. Korean Laid-Open Patent No. 1999-072284 discloses a technique in which performance of a head is determined by checking if a servo signal is detected and a reset current is applied in the opposite direction of the head.

However, head instability is determined only by a servo AGC value in the U.S. Pat. No. 5,650,887 patent. That is, the instability test of the head is performed with regard to a current level, into which data is modulated, rather than real data. Therefore, it is difficult to correctly determine if a head is in stable state or not. Similarly, the technique disclosed in Korean Laid-Open Patent No. 1999-072284 has a problem in which the instability head test is not performed directly on data and thus stability of a head cannot be determined.

SUMMARY OF THE INVENTION

To solve the above problem, it is an objective of the present invention to provide an apparatus and method for restoring stability to a head of a disc drive, in which instability of a magneto-resistive (MR) head can be easily determined by checking an error detecting rate when reading data during a process of manufacturing a hard disc assembly and improving the instability of the MR head by repetitively applying electric shocks thereto, while checking whether head instability is improved through head performance testing.

Accordingly, to achieve the above objective, there is provided an apparatus for restoring stability to an MR head of a disc drive including: an MR head having a resistance which changes in accordance with magnetic flux recorded on a disc; a signal processing unit for reproducing, in a reading mode, a signal detected by the MR head into data, as it was before being recorded, and for generating a recording current that corresponds to data to be recorded in a recording mode; a controller for performing a predetermined performance test related to data errors that can be used to check the performance of the MR head, using data reproduced in the signal processing unit during a hard disc assembly inspection process, and for generating an electric shock control signal in the event that the output of the performance test is outside of predetermined parameters; and a head feed current controller for applying a reset electric pulse, which has a level higher than the level of the MR head read current, to the MR head when the electric shock control signal is applied.

To achieve the above objective, there is also provided a method of restoring stability to an MR head of a disc drive, during a hard disc assembly inspection process, including the steps of: (a) determining whether the performance value of the MR head is within a predetermined first standard range by performing a predetermined performance test based on read data errors so as to check the performance of the MR head; (b) applying a reset current pulse to the MR head in the event that the result obtained in the step (a) is outside of the predetermined first standard range; (c) performing the predetermined performance test after the step (b) to check the performance of the MR head; (d) is checking whether the result obtained in the step (c) is outside of a predetermined second standard range; and (e) applying the reset current pulse to the MR head; and (i) repeatedly performing steps (c)–(e) when the result is outside of the predetermined second standard range or ending the process of restoring stability to the MR head when the result is within the predetermined second standard range.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
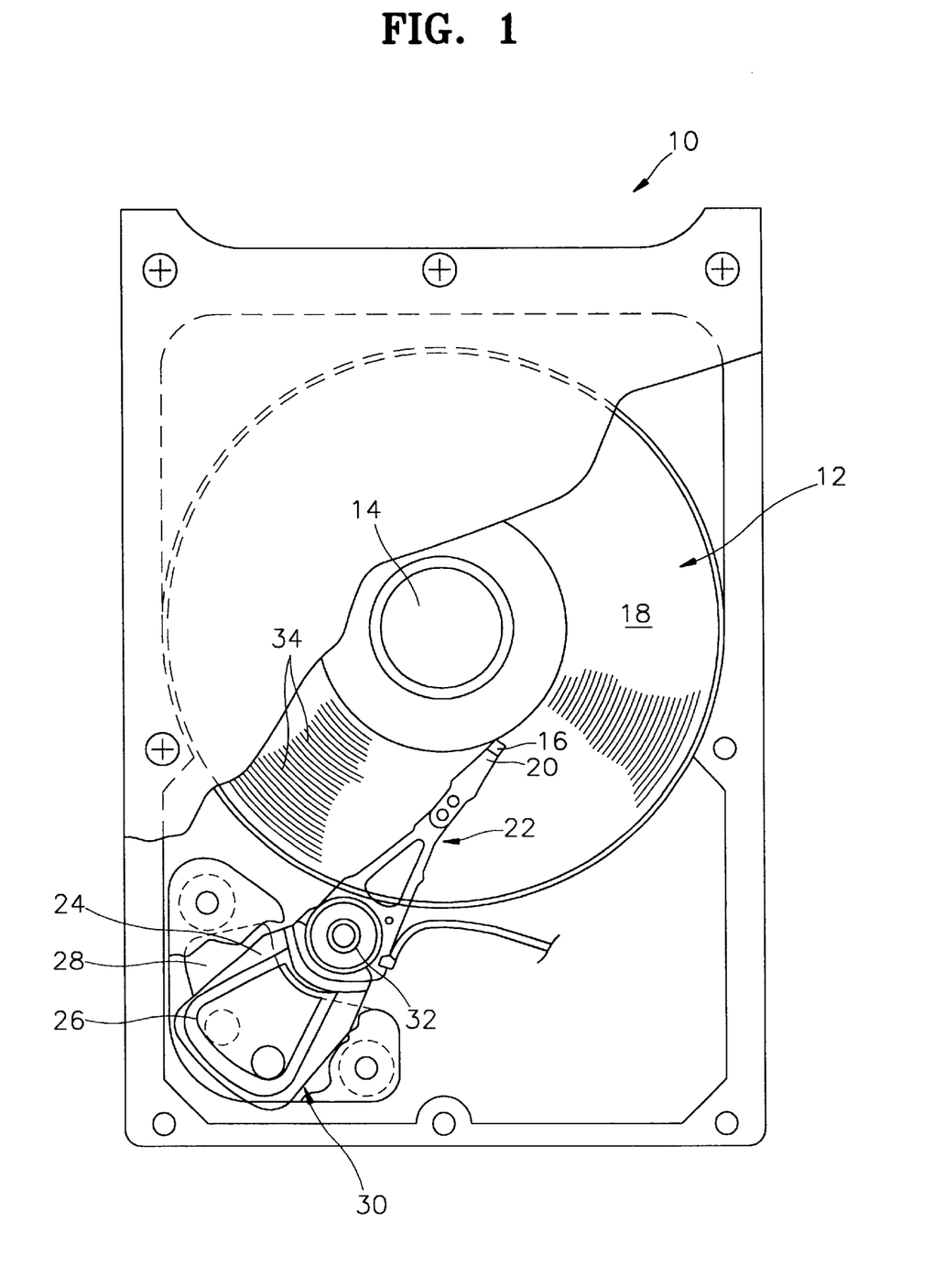
FIG. 1 is a plane view of a structure of a hard disc drive according to the present invention.

FIG. 1 shows a structure of a hard disc drive according to the present invention. A hard disc drive 10 includes at least one magnetic disc 12 that is rotated by a spindle motor 14 and a transducer 16 which is positioned near a disc surface 18.

The transducer 16 reads or records information on the rotating magnetic disc 12 by sensing and magnetizing a magnetic field of the magnetic disc 12. Although being illustrated and explained to include the single transducer 16 in FIG. 1, the drive 10 must be understood to be composed of two transducers, i.e. a transducer for recording which magnetizes the disc 12, and another transducer for reading, which is separated from the transducer for recording and senses a magnetic field of the disc 12. The transducer for reading is realized as an MR device.

Also, the transducer 16 can be included on a slider 20. The slider 20 has a structure in which an air bearing is provided between the transducer 16 and the disc surface 18 and is coupled with a head gimbal assembly 22. The head gimbal assembly 22 is adhered to an actuator arm 24 having a voice coil 26. The voice coil 26 is positioned near a magnetic assembly 28 which is coupled with a voice coil motor (VCM) 30. A current provided to the voice coil 26 generates a torque for rotating the actuator arm 24 with regard to a bearing assembly 32. The actuator arm 24 rotates across the disc surface 18 and makes the transducer 16 move.

Generally, information is stored in annular tracks provided on the disc 12. Each of the tracks 34 is configured to include a plurality of sectors, which include data fields and identification fields. Identification fields are composed of a gray code that can identify sectors and tracks (or cylinders). The transducer 16 moves across the disc surface 18 to read or record information stored in other tracks.

Figure 2:
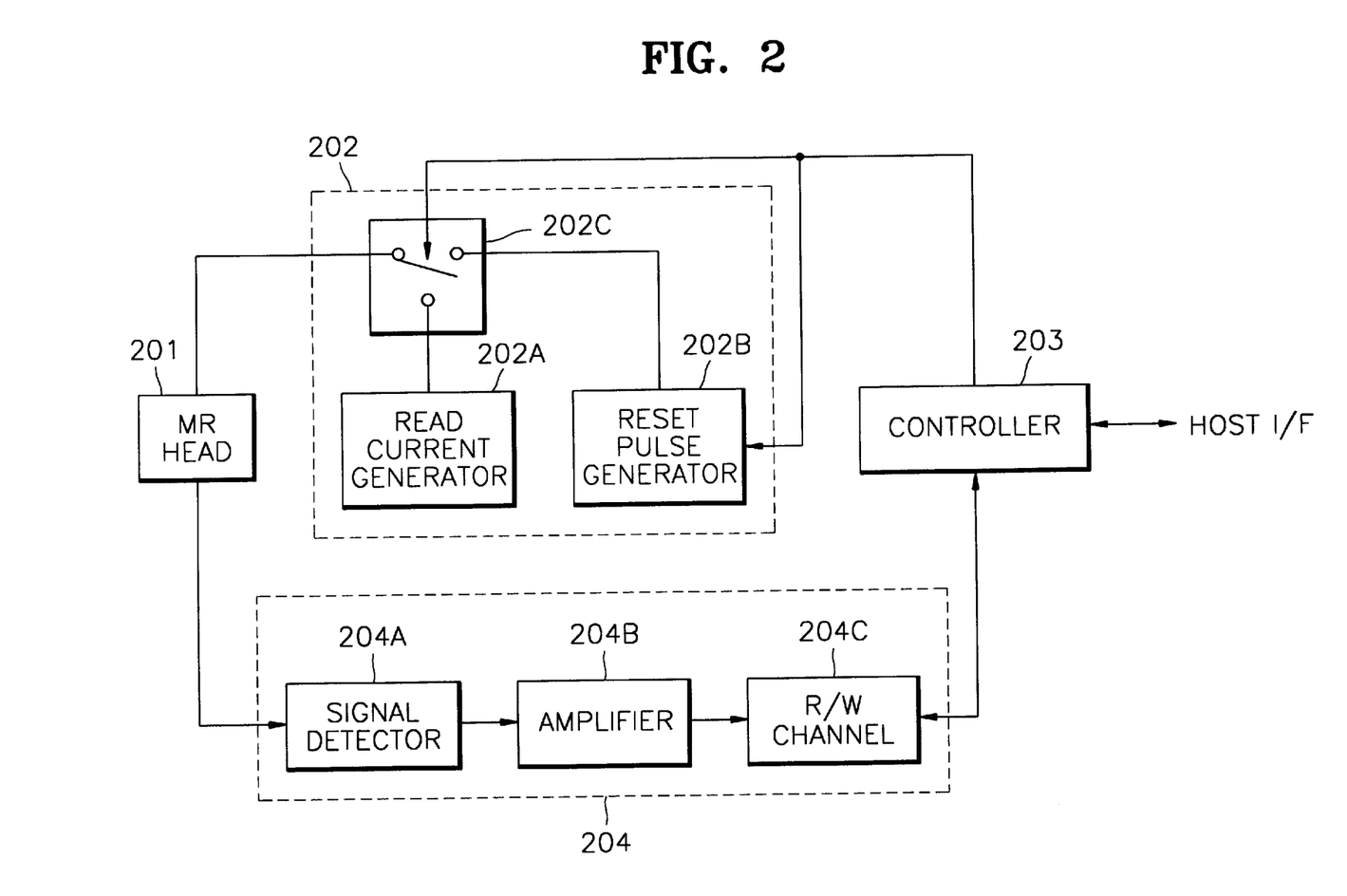
FIG. 2 is a schematic diagram of an apparatus for restoring stability to a head of a disc drive according to the present invention.

FIG. 2 is an electrical schematic view of an apparatus for restoring stability to a head of a disc drive according to the present invention. Referring to FIG. 2, the apparatus for restoring stability to a head of a disc drive includes an MR head 201, a head feed current controller 202, a controller 203 and a signal processor 204.

The head feed current controller 202 is composed of a read current generator 202A, a reset pulse generator 202B and a switching unit 202C. The signal processor 204 includes a signal detector 204A, an amplifier 204B and a R/W channel 204C.

The MR head 201 is a device for detecting data recorded on a disc in a reading mode of a hard disc drive and is formed of an alloy inductive ferromagnetic substance such as NiFe. The resistance of the MR head 201 is changed in accordance with magnetic flux recorded on the disc.

The read current generator 202A generates a current and outputs the current to the MR head 201 so that the hard disc drive can sense a change in resistance in the MR head through a current (or voltage) in response to the magnetic flux recorded on the disc in a reading mode.

Figure 5:
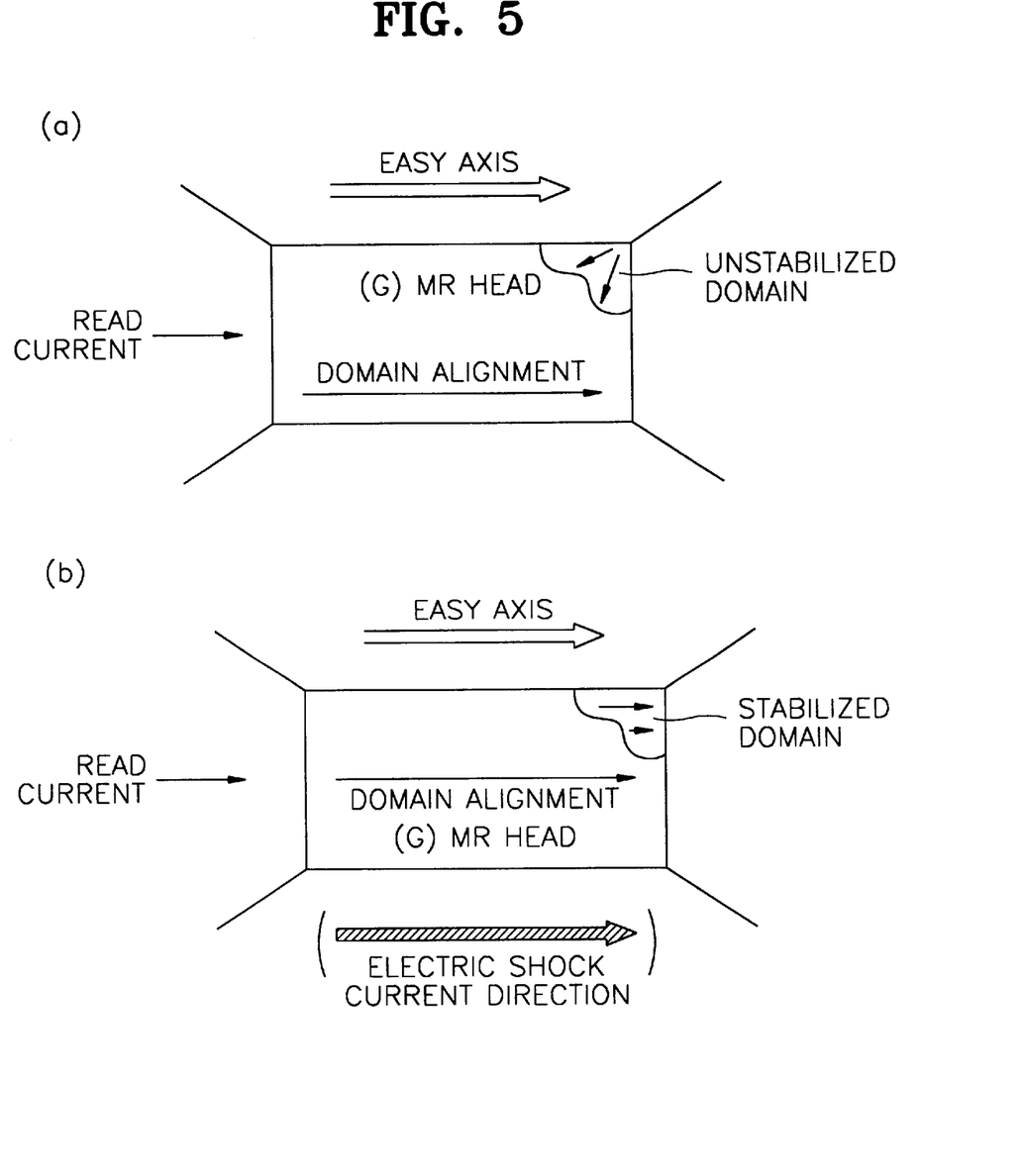
FIG. 5A illustrates domain alignment when the MR head is unstable.
FIG. 5B illustrates domain alignment after instability of the MR head is restored through electric shocks.

The reset pulse generator 202B generates a current for initializing the MR head 201 so as to align the domains in an easy axis direction when the domains are randomly aligned on the easy axis of the MR head 201 as shown in FIGS. 5A and 5B. The easy axis is a direction in which the head is easily magnetized and is a preferred orientation in terms of properties of matter. Here, a polarity of a reset pulse determines flowing of a current in the same direction of the easy axis.

The switching unit 202C switches a current applied to the MR head 201 in accordance with a control signal applied by the controller 203.

The signal detector 204A responds to a magnetic flux that is recorded on the disc by the MR head 201, perceives variations in resistance value and detects a signal recorded on the disc in the reading mode. That is, the magnetic flux recorded on the disc is detected according to a result made by multiplying the resistance value of the MR head 201 by the read current, based on an ohm principle.

The amplifier 204B amplifies a signal generated by the signal detector 204A to prepare the signal for signal processing.

The R/W channel 204C modulates an analog signal, which is read and amplified by the MR head 201, to be a digital signal that can be decoded by a host computer (not shown) and further performs signal processing by receiving user information from the host computer and converting it into a record current so that the user information is recorded on the disc.

The controller 203 controls the hard disc drive and data communications between the hard disc drive and the host computer. Further, the controller 203 controls the execution of the method of restoring stability to a head of a disc drive as presented in the present invention.

Figure 3:
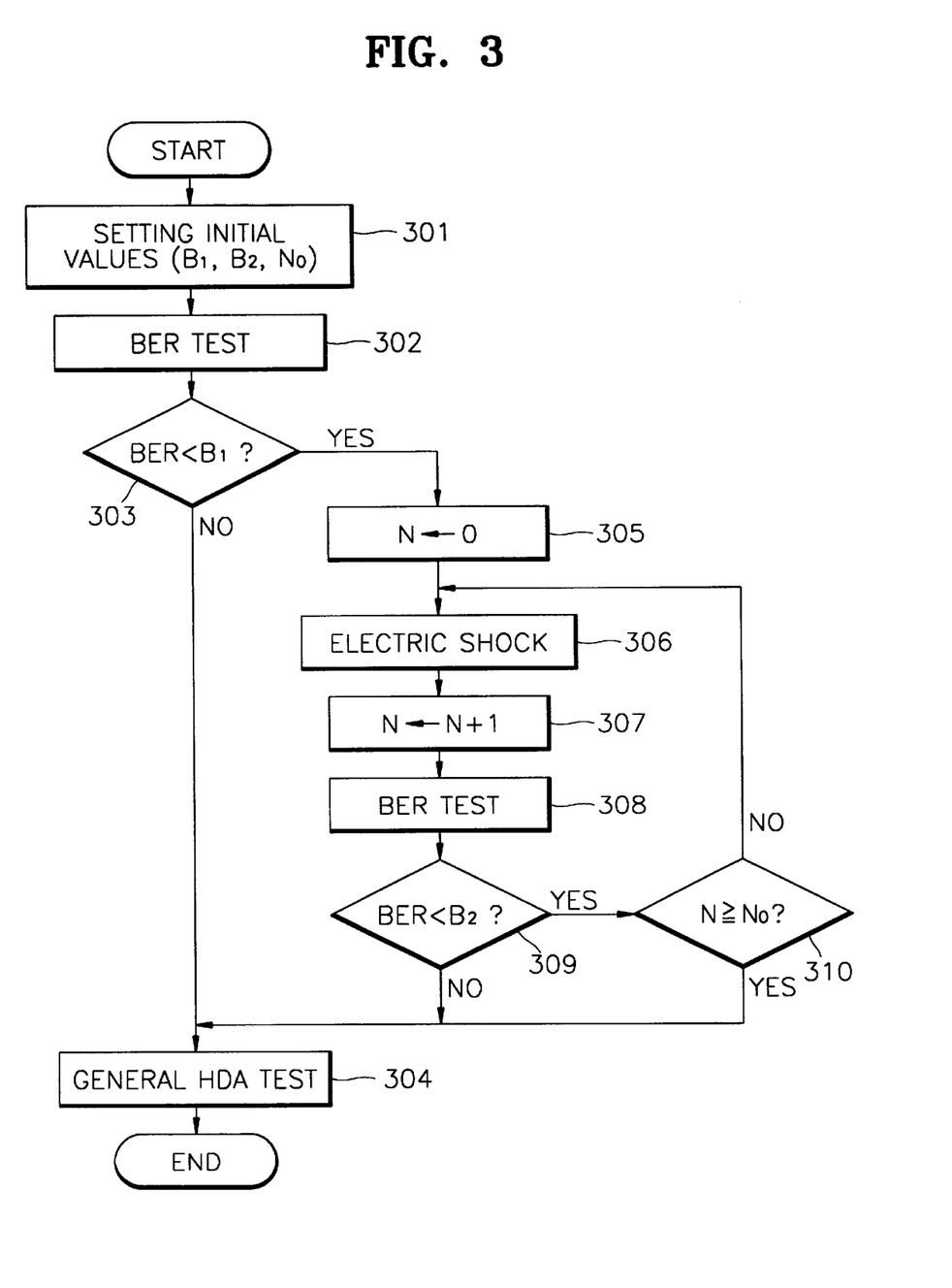
FIG. 3 is a flowchart illustrating a method of restoring stability to a head of a disc drive according to one embodiment of the present invention.
Figure 4:
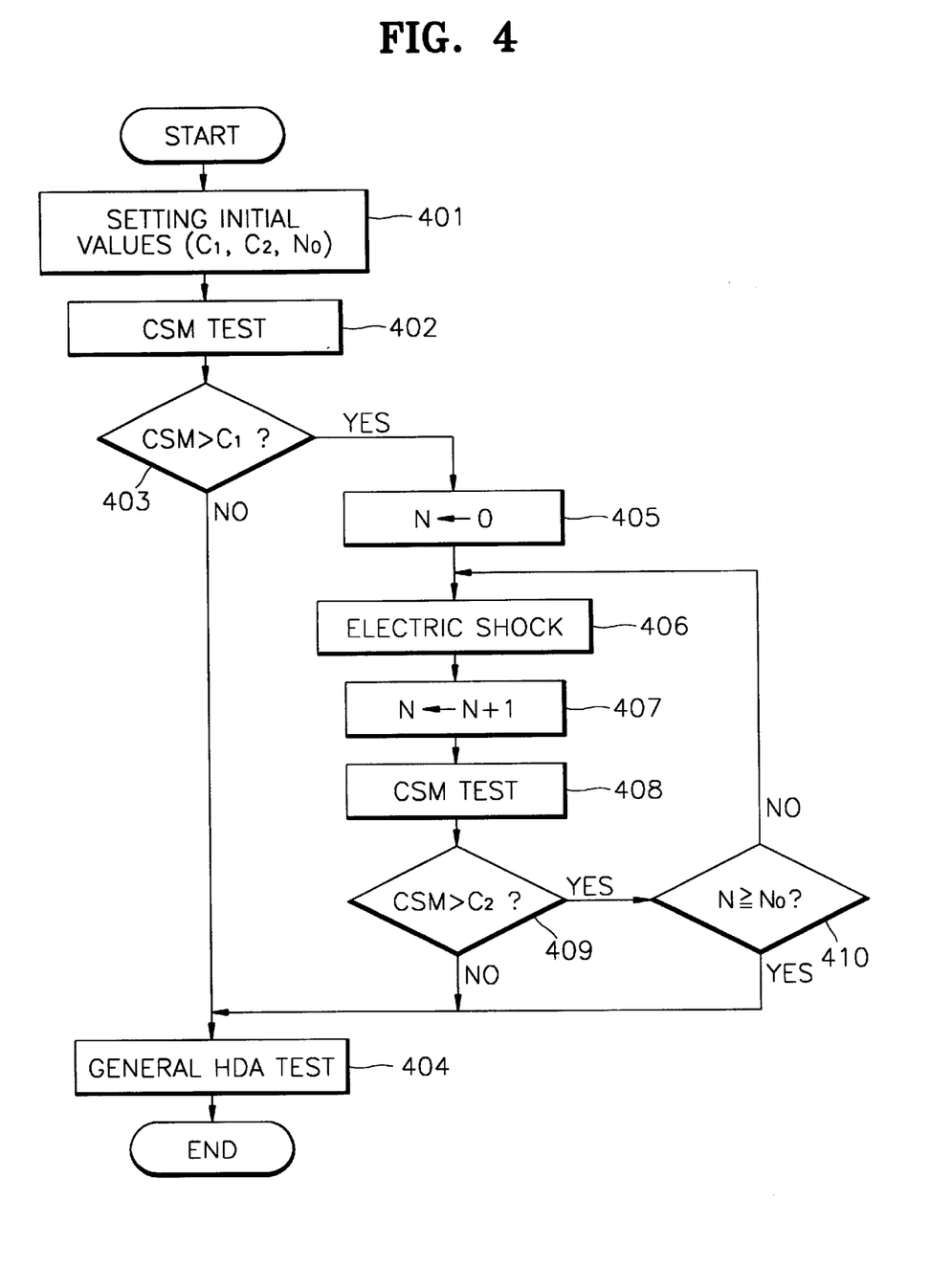
FIG. 4 is a flowchart illustrating a method of restoring stability to a head of a disc drive according to another embodiment of the present invention.

The operation of the apparatus shown in FIG. 2, will be farther explained by referring to FIGS. 3 and 4, wherein a bit error rate (BER) and a channel statistical measurement (CSM) are used when determining the head instability of a disc drive due to irregular alignment of the domain of the MR head during a hard disc assembly inspection process.

The BER is a rate that presents the number of error bits in a fixed number of data bits included in a signal read by the head and is a type of performance test used to directly examine the read instability of a head.

The CSM is a performance test that estimates bit errors provided by a channel chip and has an advantage in that the measuring time can be shorter than in the BER performance test. These tests are based on a fact that in the event that the domain alignment of the MR head is irregular, the BER and the CSM, which are related to stability of a head, are accordingly lowered.

FIGS. 3 and 4 are flowcharts showing embodiments in which the instability of the MR head is determined by the BER test and the CSM test, respectively.

FIG. 3 is a flowchart showing a method of restoring stability to a head of a disc drive according to one embodiment of the present invention. Referring to FIG. 3, initial values related to an algorithm of the present invention are set and stored in a memory of the controller 203. That is, in order to perform a process of restoring stability to the MR head, the following values are determined according to statistics obtained by these tests (step 301): a first critical bit error rate $B_1$ which is used in determining instability of the MR head; a second critical bit error rate $B_2$ which is used in determining if stability of the MR head is restored after the process; and the maximum number $N_0$ of repeatable electric shocks. Here, the second critical bit error rate $B_2$ corresponds to a critical value obtained from a performance test made after the domain of the MR head is aligned by applying electric shocks thereto, and therefore, it is preferable that the second critical bit error rate $B_2$ is set to be the same as or higher than the first critical bit error rate $B_1$. Also, the maximum number $N_0$ of repeatable electric shocks must be determined to be within the range in which the MR head is not damaged and is not greatly affected by repeatedly applying electric shocks to the MR head. It is preferable that these initial values are set based on experimental statistics. Thereafter, the controller 203 controls the hard disc drive to read recorded data in order to determine the instability of the MR head and generates the BER value of the data (step 302).

The controller 203 compares the BER value obtained during the step 302 with the initially set first critical bit error rate $B_1$ (step 303) and performs a general hard disc assembly (HDA) test (step 304) in the event that the obtained BER value is larger than or the same as the first critical bit error rate $B_1$. In this case, the performance of the MR head is normal, and therefore, a process of restoring stability to the MR head through an electric shock is omitted. In the meantime, when the obtained BER value is smaller than the first critical bit error rate $B_1$, the performance of the hard disc drive, including the MR head, is abnormal and the controller 203 performs a process of restoring stability to the MR head. In the step 305, the controller 203 resets a counting value of its inner counter N to "0" to count the number of electric shocks that are applied to the MR head.

Next, in order to apply electric shocks to the MR head for domain alignment (step 306), the controller 203 outputs a current shock control signal to the head feed current controller 202 so that the domain of the MR head is regularly aligned. Thereafter, the reset pulse generator 202B generates a high-level reset current pulse in accordance with an electric shock control signal so that the domain of the MR head is realigned. At this time, the width, amplitude and number of the reset current pulses are determined depending on the resistance value of the MR head, using statistics of experimental data values, to be within a range in which the MR head is not damaged and the domain of the MR head is effectively aligned. Particularly, the amplitude of the reset current pulse is determined to be inversely proportional to the resistance value of the MR head. The electric shock control signal controls the switching unit 202C and switches a reset pulse generated by the reset pulse generator 202B to be applied to the MR head 201.

After an electric shock is applied to the MR head once in step 306, the inner counter of the controller 203 is increased by one (step 307), and the controller 203 controls the hard disc drive to read data recorded on the disc and outputs the BER value (step 308). Next, the controller 203 reads the second critical bit error rate $B_2$ stored in the inner memory of the controller 203 and compares the same with the BER obtained during the step 308 (step 309). The controller 203 performs the HDA test (step 304) in the event that the obtained BER value is larger than or the same as the second critical bit error rate $B_2$.

According to the result obtained during the step 309, the domain of the MR head is not correctly aligned in the event that the BER value obtained during the step 308 is smaller than the second critical bit error rate $B_2$. In this case, in step 310, the controller 203 compares the counting value of the inner counter with the maximum number $N_0$ of electric shocks and performs the general HDA test according to the step 304 if the counting value N is larger than or the same as the maximum number $N_0$, at which time the performance of the MR head cannot be stabilized through any further electric shocks. On the contrary, when the counting value N is smaller than the maximum number $N_0$, electric shocks are again applied to the MR head by returning back to step 306. Steps 306–310 are repeatedly performed until it is determined that either the BER value is no longer less than $B_2$ or the counting value N is no longer smaller than the maximum number $N_0$.

As described above, instability of the MR head is inspected with respect to the bit error rate (BER) and then, instability of domain alignment of the MR head is improved by applying electric shocks thereto.

FIG. 4 is a flowchart showing a method of restoring stability to a head of a disc drive according to another embodiment of the present invention. Referring to FIG. 4, initial values related to an algorithm of the present invention are set and stored in the memory of the controller 203. Specifically, in order to perform a process of restoring stability to the MR head, the following values are determined according to statistics obtained by experimental statistics (step 401): a first critical CSM $C_1$ which is used in determining the instability of the MR head; a second critical CSM $C_2$ which is used in determining if the instability of the MR head is restored after the process; and the maximum number $N_0$ of repeatable electric shocks. Here, the second critical CSM $C_2$ corresponds to a critical value obtained from a performance test made after the domain of the MR head is aligned by applying electric shocks thereto, and therefore, it is preferable that the second critical CSM $C_2$ be set to be the same as or smaller than the first critical CSM $C_1$. Also, the maximum number $N_0$ of repeatable electric shocks must be determined within the range that the MR head is not damaged and is not largely affected by repeatedly applying electric shocks to the MR head. It is preferable that these initial values are set referring to experimental statistics.

Thereafter, the controller 203 controls the hard disc drive to read data recorded during a servo write process in order to determine the instability of the MR head and performs the CSM test with regard to the read data (step 402). The controller 203 compares the obtained CSM value with the initially set first critical CSM $C_1$ (step 403) and performs a general hard disc assembly (HDA) test in the event that the obtained CSM is smaller than or the same as the first critical CSM $C_1$ (step 404). In this case, the performance of the MR head is normal, and therefore, a process of restoring stability to the MR head through an electric shock is omitted. On the contrary, when the obtained CSM is larger than the first critical CSM $C_1$, the performance of the hard disc drive, including the MR head, is abnormal, and the controller 203 performs a process of restoring stability to the MR head. In the step 405, the controller 203 resets a count value N of its inner counter to "0" to count the number of electric shocks applied to the MR head.

Next, in order to apply an electric shock to the MR head for domain alignment (step 406), the controller 203 outputs a current shock control signal to the head feed current controller 202 so that the domain of the MR head is regularly aligned. Thereafter, the reset pulse generator 202B generates a comparatively high-level reset current pulse in accordance with an electric shock control signal, so that the domain of the MR head is realigned. The width, amplitude and number of the reset electric pulse are determined depending on a resistance value of the MR head, using statistics of experimental data value, to be within a range in which the MR head is not damaged and the domain of the MR head is effectively aligned. Particularly, the amplitude of the reset electric pulse is determined to be inversely proportional to the resistance value of the MR head. The electric shock control signal controls the switching unit 202C and switches a reset pulse generated by the reset pulse generator 202B to be applied to the MR head 201.

After an electric shock is applied to the MR head once according to the step 406, the inner counter of the controller 203 is increased by one (step 407) and the controller 203 controls the hard disc drive to read data recorded on the disc and outputs the CSM value (step 408). Next, the controller 203 reads the second critical CSM $C_2$ stored in the inner memory of the controller 203 and compares the same with the CSM value obtained during the step 408 (step 409). The controller 203 performs the HDA test (step 404) in the event that the obtained CSM value is smaller than or the same as the second critical CSM $C_2$.

According to the result obtained during step 409, the domain of the MR head is not correctly aligned in the event that the CSM value obtained during the step 408 is larger than the second critical CSM $C_2$. In this case, in step 410, the controller 203 compares the count value N of the inner counter with the maximum number $N_0$ of electric shocks and performs the HDA test according to the step 404 when the count value N is larger than or the same as the maximum number $N_0$, at which time the performance of the MR head cannot be stabilized through any further electric shocks. On the contrary, when the count value N is smaller than the maximum number $N_0$, the process returns back to step 406, and electric shock is again applied to the MR head, and then the CSM test is performed. Steps 406–410 are repeatedly performed until it is determined that either the CSM value is less than the second critical CSM $C_2$ or the counting value N is no longer smaller than the maximum number $N_0$.

After instability of the MR head is examined by the CSM test through the above-described methods, the unstabilized domain of the MR head can be improved by applying electric shocks to the MR head.

As described above, it is preferable that the process of restoring the stability to the MR head according to the present invention is performed during the hard disc assembly inspection process, and especially, prior to a servo correction process.

The present invention can be realized as a method, apparatus or system. If realized as software, elements constituting the present invention are code segments that execute the necessary operations. The program or code segments can be stored in a processor-readable medium or can be transmitted by a computer data signal coupled with a carrier wave in a transmission medium or communications network. Any medium that can store or transmit information can be used as the processor-readable medium, such as electric circuits, semiconductor memory devices, ROM, flash memories, erasable ROMs, floppy discs, optical discs, hard discs, optical fiber mediums and radio frequency (RF) network. The computer data signal is a signal that can be transmitted on an electronic network channel, optical fiber, air, electronic system, RF network and so on.

While the present invention has been particularly shown and described with reference to the preferred embodiments thereof, the present invention is not restricted to the above embodiment. Thus it will be understood by those skilled in the art that various changes in form and details may be made without departing from the spirit and scope of the invention as defined by the appended claims.

As described above, according to the present invention, instability of the MR head, i.e. irregular alignment of the domain of the MR head, is determined by a bit error rate (BER) test or channel statistical measurement (CSM) test, and if instability of the MR head is determined, the MR head is restored by applying electric shocks thereto. Therefore, the present invention has advantages in that manufacturing process inferiority rate due to head instability in a hard disc drive can be reduced, yield can be improved and the defect rate can be improved.

What is claimed is:

1. A method of restoring stability to a magneto resistive (MR) head of a disc drive, comprising the steps of:
   (a) determining whether a performance value of the MR head is less than a predetermined first bit error rate value by performing a bit error rate test based on read data errors so as to check the performance of the MR head;
   (b) applying a reset current pulse to the MR head in the event that the result obtained in the step (a) is less than the predetermined first bit error rate value, wherein a level of the current pulse is determined to be inversely proportional to a resistance value of the MR head;
   (c) performing the bit error rate test after the step (b) to check the performance of the MR head; and
   (d) checking whether the result obtained in the step (c) is less than a predetermined second bit error rate value and applying the reset current pulse to the MR head and returning back to the step (c) when the result of step (d) is less than the predetermined second bit error rate value or ending the process of restoring stability to the MR head when the result is not less than the predetermined second bit error rate value.

2. The method of claim 1, wherein the predetermined second bit error rate value is set to be higher than the predetermined first bit error rate value.

3. The method of claim 1, wherein the polarity of the reset current pulse is determined so that a current flows in the same direction as an easy axis of the MR head.

4. The method of claim 1, wherein the number of times the process feeds back from the step (d) to the step (c) is limited considering predetermined characteristics of the MR head.

5. The method of claim 1, wherein the predetermined second bit error rate value is set to be the same as the predetermined first bit error rate value.

6. The method of claim 1, wherein the process of restoring stability to the MR head is performed during a hard disc assembly inspection process.

7. The method of claim 1, wherein the process of restoring stability to the MR head is performed during a hard disc assembly inspection process and prior to a servo correcting process.

8. An apparatus for restoring stability to a magneto resistive (MR) head of a disc drive, comprising:
- an MR head having a resistance which changes in accordance with magnetic flux recorded on a disc;
- a signal processing unit for reproducing a signal detected by the MR head into data, as it was before being recorded, in a reading mode and generating a recording current that corresponds to data to be recorded in a recording mode;
- a controller for performing a predetermined performance test, related to read data errors used to check the performance of the MR head, using data reproduced in the signal processing unit, and for generating an electric shock control signal in the event that the result of the performance test is determined to be outside of a predetermined critical range; and
- a head feed current controller for applying to the MR head a reset current pulse in accordance with said electric shock control signal, said reset current pulse having a higher level than a MR head read current, wherein the level of the reset current pulse is determined to be inversely proportional to a resistance value of the MR head.

9. The apparatus of claim 8, wherein the predetermined performance test regarding read data errors is based on a bit error rate test.

10. The apparatus of claim 8, wherein the predetermined performance test regarding read data errors is based on a channel statistical measurement test.

11. The apparatus of claim 8, wherein the controller performs the predetermined performance test and repeatedly outputs the electric shock control signal when the performance test result is outside of said predetermined critical range.

12. The apparatus of claim 11, wherein the number of times the electric shock control signal is repeatedly generated is limited considering predetermined characteristics of the MR head.

13. The apparatus of claim 8, wherein the polarity of the reset current pulse is determined so that a current flows in the same direction as an easy axis of the MR head.

14. The apparatus of claim 8, wherein the head feed current controller comprises:
- a read current generator for generating the read current of the MR head;
- a reset pulse generator for generating the reset current pulse so that a domain of the MR head is aligned; and
- a switching unit for receiving output signals of the read current generator and the reset pulse generator, and in response to the electric shock control signal switching the output signal of the reset pulse generator and outputting the same to the MR head when the electric shock control signal is applied, or switching the output signal of the read current generator and outputting the same to the MR head when the electric shock control signal is not applied.

15. The apparatus of claim 9, wherein the predetermined critical range is between a first critical bit error rate value and a second critical bit error rate value higher than the first critical bit error rate value.

16. The apparatus of claim 10, wherein the predetermined critical range is between a first critical channel statistical measurement value and a second critical channel statistical measurement value smaller than the first critical channel statistical measurement value.

17. A method of restoring stability to a magneto resistive (MR) head of a disc drive, comprising the steps of:
- (a) determining whether a performance value of the MR head is greater than a predetermined first value by performing a channel statistical measurement test based on read data errors so as to check the performance of the MR head;
- (b) applying a reset current pulse to the MR head in the event that the result obtained in the step (a) is greater than the predetermined first value;
- (c) performing said channel statistical measurement test after the step (b) to check the performance of the MR head; and
- (d) checking whether the result obtained in the step (c) is greater than a predetermined second value, and applying the reset current pulse to the MR head and returning back to the step (c) when the result is greater than the predetermined second value or ending the process of restoring stability to the MR head when the result is not greater than the predetermined second value, the steps (c) and (d) being repeated a limited number of times considering predetermined characteristics of the MR head when the result is greater than the predetermined second value.

18. The method of claim 17, wherein the predetermined second value is smaller than the predetermined first value.

19. The method of claim 17, wherein a level of the reset current pulse is determined to be inversely proportional to a resistance value of the MR head.

20. The method of claim 17, wherein the predetermined second value is the same as the predetermined first value.

* * * * *